(12) United States Patent
Lee

(10) Patent No.: US 9,164,265 B2
(45) Date of Patent: Oct. 20, 2015

(54) CAMERA LENS MODULE

(75) Inventor: Kyunghwan Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 14/114,645

(22) PCT Filed: Apr. 27, 2012

(86) PCT No.: PCT/KR2012/003290
§ 371 (c)(1),
(2), (4) Date: Oct. 29, 2013

(87) PCT Pub. No.: WO2012/148215
PCT Pub. Date: Nov. 1, 2012

(65) Prior Publication Data
US 2014/0049834 A1     Feb. 20, 2014

(30) Foreign Application Priority Data

Apr. 29, 2011 (KR) .................. 10-2011-0040637
Apr. 25, 2012 (KR) .................. 10-2012-0043109

(51) Int. Cl.
*G02B 15/00* (2006.01)
*G02B 15/14* (2006.01)
*G02B 13/00* (2006.01)
*G02B 15/173* (2006.01)

(52) U.S. Cl.
CPC .............. *G02B 15/14* (2013.01); *G02B 13/009* (2013.01); *G02B 13/0045* (2013.01); *G02B 15/173* (2013.01)

(58) Field of Classification Search
CPC .... G02B 15/14; G02B 15/173; G02B 13/009; G02B 13/0045
USPC .......................................... 359/676, 677, 683
See application file for complete search history.

(56) References Cited

U.S. PATENT DOCUMENTS

| | | |
|---|---|---|
| 5,982,560 A | 11/1999 | Moon |
| 7,864,454 B1 | 1/2011 | Tang et al. |
| 2010/0220229 A1 | 9/2010 | Sano |
| 2011/0273611 A1 | 11/2011 | Matsusaka et al. |

(Continued)

FOREIGN PATENT DOCUMENTS

| | | |
|---|---|---|
| CN | 101819315 A | 9/2010 |
| JP | 08-029683 A | 2/1996 |

(Continued)

OTHER PUBLICATIONS

International Search Report in International Application No. PCT/KR2012/003290, filed Apr. 27, 2012.

(Continued)

*Primary Examiner* — David N Spector
(74) *Attorney, Agent, or Firm* — Saliwanchik, Lloyd & Eisenschenk (57) ABSTRACT

A camera lens module in which an optical system is configured to include five sheets of lenses is provided. In the camera lens module, first, second, third, fourth and fifth lenses are sequentially arranged from an object side, and the first lens performs a zooming operation while moving along an optical axis. Accordingly, the optical system is configured to include five sheets of lenses for performance of a zooming operation and to allow only the first lens to perform the zooming operation, so that it is possible to manufacture a high-resolution optical system in a compact size and to perform the zooming operation at a high speed.

38 Claims, 9 Drawing Sheets

(56) References Cited

U.S. PATENT DOCUMENTS

| | | |
|---|---|---|
| 2012/0075721 A1 | 3/2012 | Konishi et al. |
| 2014/0268362 A1* | 9/2014 | Lee .............................. 359/676 |

FOREIGN PATENT DOCUMENTS

| | | |
|---|---|---|
| KR | 10-1998-0046759 A | 9/1998 |
| KR | 10-0247292 B1 | 3/2000 |
| KR | 10-2009-0029562 A | 3/2009 |
| WO | WO-2010143459 A1 | 12/2010 |
| WO | WO-2011/027690 A1 | 3/2011 |

OTHER PUBLICATIONS

International Search Report dated Jan. 19, 2015 in International Application No. PCT/KR2012/003290.

Office Action dated May 27, 2015 in Chinese Application No. 201280021017.4.

* cited by examiner

CAMERA LENS MODULE

CROSS-REFERENCE TO RELATED APPLICATIONS

This application is the U.S. national stage application of International Patent Application No. PCT/KR2012/003290, filed Apr. 27, 2012, which claims priority to Korean Application Nos. 10-2011-0040637, filed Apr. 29, 2011, and 10-2012-0043109, filed Apr. 25, 2012, the disclosures of each of which are incorporated herein by reference in their entirety.

TECHNICAL FIELD

The present invention relates to a camera lens module, and more particularly, to a camera lens module which is configured to include five sheets of lenses, thereby implementing high resolution in a compact size.

BACKGROUND ART

Mobile terminals are gradually developed together with the increase in their amount used, and various functions and services are developed accordingly. A portable terminal such as a mobile terminal or smart phone has a camera to take photographs or moving pictures, and provides a service for storing the taken image or performing video communication. Recently, a camera module has been mounted in most portable terminals. That is, demands on micro-miniature camera modules are rapidly increased.

In a micro-miniature camera module, high resolution is implemented as the number of sheets of lenses increases. A recent camera module has a built-in auto focusing (AF) function of moving a portion of lenses to an optical axis. An AF module is a conventional driving means for moving lenses, and a voice coil motor (VCM) was used as the AF module.

The VCM is a motor developed based on the principle that a diaphragm is vibrated by a force generated between voice current flowing in the coil of a speaker and a magnetic force of a permanent magnet according to the Fleming's left-hand rule. The VCM performs a linear reciprocating motion on a lens at a short distance,

DISCLOSURE

Technical Problem

The present invention is conceived to solve the aforementioned problems. Accordingly, an object of the present invention is to provide a camera lens module mounted in a camera module, so that it is possible to implement high resolution and to allow a device to be slim in size, thereby performing a zooming operation at a high speed.

Technical Solution

According to an aspect of the present invention, there is provided a camera lens module wherein a first lens, a second lens, a third lens, a fourth lens and a fifth lens are sequentially arranged from an object side, and the first lens performs a zooming operation while moving along an optical axis.

The first lens may be movable along the optical axis.

A stop may be positioned on an object side surface of the first lens.

The first, second, third, fourth and fifth lenses may be formed of a plastic material.

The first lens may have a positive refractive power.

The second lens may have a negative refractive power. The second lens may have a meniscus shape in which the object side surface of the second lens is convex toward the object side.

The third lens may have a positive refractive power. The third lens may have a meniscus shape in which the object side surface of the third lens is convex toward the object side.

The fourth lens may have a positive refractive power. The fourth lens may have a meniscus shape in which the image side surface of the fourth lens is convex toward an image side.

The fifth lens may have a negative refractive power.

At least one of the first, second, third, fourth and fifth lenses may have at least one surface formed as an aspheric surface.

Each of the first, second, third, fourth and fifth lenses may have at least one surface formed as an aspheric surface. Each of the first, second, third, fourth and fifth lenses may have at least one surface formed as an aspheric surface. Each of the first, second, third, fourth and fifth lenses may have both surfaces formed as aspheric surfaces.

The image side surface of the third lens may have an inflection point. The image side surface of the fourth lens may have an inflection point.

Each of the object side surface and image side surface of the fifth lens may have one or more inflection points An infrared filter may be disposed between the fifth lens and an imaging surface.

The camera lens module may satisfy one or more of the following conditional expressions.

| | |
|---|---|
| $0.5 < f1/fz1 < 1.5$ | (Conditional expression 1) |
| $0.5 < f1/fz2 < 1.5$ | (Conditional expression 2) |
| $0.5 < f1/fz3 < 1.5$ | (Conditional expression 3) |
| $0.1 < d1 < 0.4$ | (Conditional expression 4) |
| $0.15 < d3 < 0.51$ | (Conditional expression 5) |
| $0.5 < \Sigma T/fz1 < 1.5$ | (Conditional expression 6) |
| $0.5 < \Sigma T/fz2 < 1.5$ | (Conditional expression 7) |
| $0.5 < \Sigma T/fz3 < 1.5$ | (Conditional expression 8) |
| $1.5 < N1 < 1.6$ | (Conditional expression 9) |
| $1.6 < N2 < 1.7$ | (Conditional expression 10) |
| $1.5 < N3 < 1.6$ | (Conditional expression 11) |
| $1.5 < N4 < 1.6$ | (Conditional expression 12) |
| $1.5 < N5 < 1.6$ | (Conditional expression 13) |
| $50 < V1 < 60$ | (Conditional expression 14) |
| $20 < V2 < 30$ | (Conditional expression 15) |
| $50 < V3 < 60$ | (Conditional expression 16) |
| $50 < V4 < 60$ | (Conditional expression 17) |
| $50 < V5 < 60$ | (Conditional expression 18) |
| $4.7 < \Sigma T < 5.9$ | (Conditional expression 19) |
| $2.0 < F\text{-number} < 3.0$ | (Conditional expression 20) |

Here, f1 denotes a focal distance of the first lens; fz1, fz2 and fz3 denote focal distances of first, second and third zoom positions in an optical system, respectively; d1 and d3 denote air intervals between centers of the first and second lenses in the first and third zoom positions, respectively; ΣT denotes a distance from the object side surface of the first lens to the imaging surface; N1, N2, N3, N4 and N5 denote refractive indices of the first, second, third, fourth and fifth lenses, respectively; and V1, V2, V3, V4 and V5 denote Abbe numbers of the first, second, third, fourth and fifth lenses, respectively.

Advantageous Effects

According to the camera lens module configured as described above, an optical system is so configured as to allow a first lens of the optical system configured to include five sheets of lenses to perform a zooming operation, so that it is possible to manufacture a high-resolution optical system in a compact size and to perform the zooming operation at a high speed.

MODE FOR INVENTION

The present invention is described more fully hereinafter with reference to the accompanying drawings, in which embodiments of the present invention are shown. This present invention may, however, be embodied in many different forms and should not be construed as limited to the embodiments set forth herein. Rather, these embodiments are provided so that this disclosure is thorough, and will fully convey the scope of the present invention to those skilled in the art.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present.

In the drawings, the thickness of layers, films and regions are exaggerated for clarity. Like numerals refer to like elements throughout.

Figure 1:
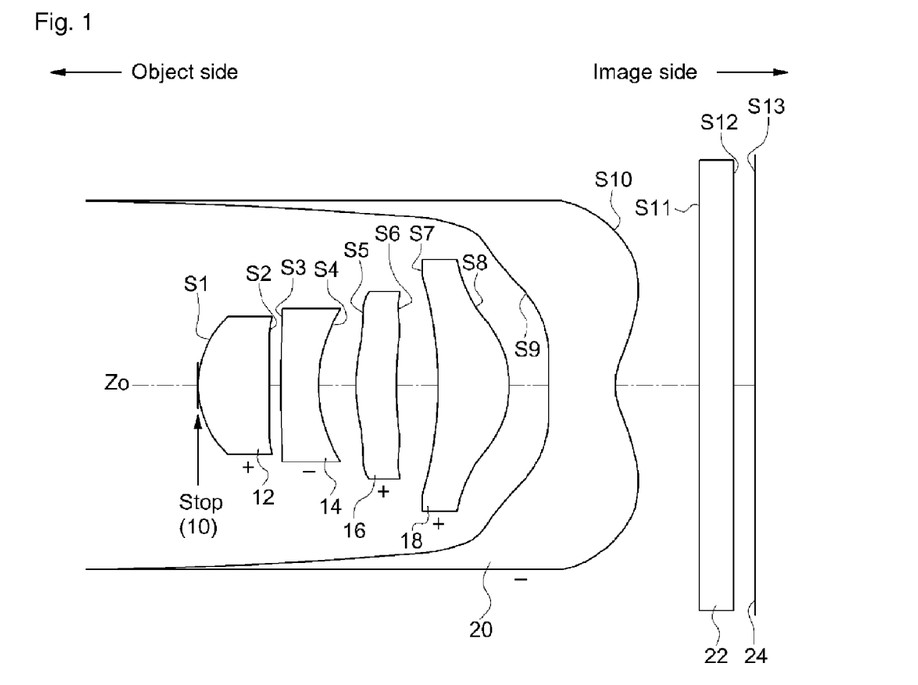
FIG. 1 is a configuration view of a camera lens module according to the present invention.

FIG. 1 is a configuration view of a camera lens module according to the present invention. FIG. 1 is a side configuration view illustrating an arrangement state of lenses based on an optical axis Zo.

Referring to FIG. 1, the camera lens module according to the present invention is configured to an optical system in which five sheets of lenses, i.e., a first lens 12, a second lens 14, a third lens 16, a fourth lens 18 and a fifth lens 20 are sequentially arranged from an object. The five sheets of lenses may be formed of various materials. For example, all the five sheets of lenses may be formed of a plastic material.

An infrared filter 22 for filtering infrared wavelengths and an imaging surface 24 are positioned at the back of the fifth lens 20. The imaging surface 24 is a surface on which an image is formed, and an image sensor such as a charge coupled device (CCD) or complementary metal oxide semiconductor (CMOS) sensor is mounted on the imaging surface 24.

In the following description of the configuration of the first lens 12, the second lens 14, the third lens 16, the fourth lens 18 and the fifth lens 20, the term "object side surface" refers to a surface of a lens facing an object based on the optical axis, and the "image side surface" refers to a surface of a lens facing the imaging surface 24 based on the optical axis.

The first lens 12 has a positive (+) refractive power. As shown in FIG. 1, a stop 10 of the optical system is positioned on the object side surface 51 of the first lens 12.

In the present invention, a zooming operation of the optical system is achieved by moving only the first lens 12 to the optical axis. The first lens 12 may be moved along the optical axis by an actuator.

As such, the zooming operation is performed by positioning the stop 10 on the object side surface 51 of the first lens 12 and moving only the first lens 12. Accordingly, although the optical system is configured with the five sheets of lenses, the camera lens module having high resolution can be designed to be slim. Further, when the zooming operation is performed from a wide position to a tele position, a high-speed zooming operation is possible.

The second lens 14 has a negative (−) refractive power. For example, the second lens 14 has a meniscus shape in which the object side surface S3 of the second lens 14 is convex toward an object side.

The third lens 16 has a positive (+) refractive power. For example, the third lens 16 has a meniscus shape in which the object side surface S5 of the third lens 16 is convex toward the object side. The image side surface S6 of the third lens 16 has an inflection point.

The fourth lens 18 has a positive (+) refractive power. The fourth lens 18 has a meniscus shape in which the image side surface S8 of the fourth lens 18 is convex toward an image side. The image side surface S8 of the fourth lens 18 has an inflection point.

The fifth lens 20 has a negative (−) refractive power. Each of the object side surface S9 and image side surface S10 of the fifth lens 20 has one or more inflection points.

At least one of the first lens 12, the second lens 14, the third lens 16, the fourth lens 18 and the fifth lens 20 may have at least one surface formed as an aspheric surface. In the embodiment shown in this figure, all the first, second, third, fourth and fifth lenses 12, 14, 16, 18 and 20 have both surfaces formed as aspheric surfaces. The embodiment in which both the surfaces of all the lenses are formed to be aspheric will be described in detail with reference to the following tables.

The present invention provides conditions for improving resolution of the lenses, correcting chromatic aberration and reducing distortion aberration through the configuration of the optical system described above. The following conditional expressions and embodiments illustrate exemplary embodiments that increase operational effects of the present invention, and it will be obvious to those skilled in the art that the present invention is necessarily configured under the following conditions. For example, the configuration of the lenses can increase the operational effects of the present invention even when the present invention satisfies only some of the following conditional expressions.

First, conditional expressions related to focal distances in the optical system are as follows.

$$0.5 < f1/fz1 < 1.5 \quad \text{(Conditional expression 1)}$$

$$0.5 < f1/fz2 < 1.5 \quad \text{(Conditional expression 2)}$$

$$0.5 < f1/fz3 < 1.5 \quad \text{(Conditional expression 3)}$$

Here, f1 denotes a focal distance of the first lens, and fz1, fz2 and fz3 denote focal distances of first, second and third zoom potions in the optical system, respectively.

The first zoom position is a zoom position of a tele position having an infinite photographing range. The second zoom position is a zoom position of a middle position having a photographing range of 60 cm. The third zoom position is a zoom position of a wide position having a photographing range of 10 cm.

The air interval between the centers of the first and second lenses 12 and 14 in the tele and wide positions satisfies the following conditional expressions.

$$0.1 < d1 < 0.4 \quad \text{(Conditional expression 4)}$$

$$0.15 < d3 < 0.51 \quad \text{(Conditional expression 5)}$$

Here, d1 and d3 denote air intervals between the centers of the first and second lenses in the first and third zoom positions, respectively.

The distance from the object side surface 51 of the first lens 12 to the imaging surface 24 in each of the zoom positions and the focal distance of the optical system in each of the zoom positions satisfy the following conditional expressions.

$$0.5 < \Sigma T/fz1 < 1.5 \quad \text{(Conditional expression 6)}$$

$$0.5 < \Sigma T/fz2 < 1.5 \quad \text{(Conditional expression 7)}$$

$$0.5 < \Sigma T/fz3 < 1.5 \quad \text{(Conditional expression 8)}$$

Here, $\Sigma T$ denotes a distance from the object side surface of the first lens to the imaging surface.

The refractive index of each of the lenses satisfies the following conditional expressions.

$$1.5 < N1 < 1.6 \quad \text{(Conditional expression 9)}$$

$$1.6 < N2 < 1.7 \quad \text{(Conditional expression 10)}$$

$$1.5 < N3 < 1.6 \quad \text{(Conditional expression 11)}$$

$$1.5 < N4 < 1.6 \quad \text{(Conditional expression 12)}$$

$$1.5 < N5 < 1.6 \quad \text{(Conditional expression 13)}$$

Here, N1, N2, N3, N4 and N5 denote refractive indices of the first, second, third, fourth and fifth lenses, respectively.

The Abbe numbers of the lenses satisfy the following conditional expressions, respectively.

$$50 < V1 < 60 \quad \text{(Conditional expression 14)}$$

$$20 < V2 < 30 \quad \text{(Conditional expression 15)}$$

$$50 < V3 < 60 \quad \text{(Conditional expression 16)}$$

$$50 < V4 < 60 \quad \text{(Conditional expression 17)}$$

$$50 < V5 < 60 \quad \text{(Conditional expression 18)}$$

Here, V1, V2, V3, V4 and V5 denote Abbe numbers of the first, second, third, fourth and fifth lenses, respectively.

The distance from the object side surface Si of the first lens 12 to the imaging surface 24 and the F-number of the camera lens module satisfy the following conditional expressions.

$$4.7 < \Sigma T < 5.9 \quad \text{(Conditional expression 19)}$$

$$2.0 < F\text{-number} < 3.0 \quad \text{(Conditional expression 20)}$$

The F-number is a numerical number obtained by dividing the focal distance of a lens by the diameter of a lens aperture, and represents brightness of the lens. As the numerical value of the F-number is smaller, the lens receives a larger amount of light under the same condition.

Hereinafter, the present invention will be described through detailed numerical embodiments. The following Table 1 shows an embodiment satisfying the conditional expressions described above.

TABLE 1

|  | Embodiment |
| --- | --- |
| Fz1 (Tele) | 3.9800 |
| Fz2 (Middle) | 3.9653 |
| Fz3 (Wide) | 3.8931 |
| f1 | 3.06 |
| f2 | −4.34 |
| f3 | 16.70 |
| f4 | 3.19 |
| f5 | −2.66 |
| f1/fz1 | 0.7688 |
| f1/fz2 | 0.7717 |
| f1/fz3 | 0.7860 |
| d1 | 0.1 |
| d3 | 0.19 |
| ΣT | 4.85 |
| ΣT/fz1 | 1.2186 |
| ΣT/fz2 | 1.2231 |
| ΣT/fz3 | 1.2458 |
| N1 | 1.53 |
| V1 | 56.5 |
| N2 | 1.64 |
| V2 | 23.9 |
| N3 | 1.53 |
| V3 | 56.5 |
| N4 | 1.53 |
| V4 | 56.5 |
| N5 | 1.53 |
| V5 | 56.5 |

The following Table 2 shows an embodiment of each of the surfaces 51 to S12 in the lenses and the infrared filter. In Table 2, the surface numbers correspond to surfaces designated by 51 to S12 in FIG. 1, respectively. In FIG. 1, the surface designated by S13 is the imaging surface 24. The term "*" added to each of the surface numbers represents an aspheric surface.

TABLE 2

| Surface number | Radius of Curvature (R) | Distance (d) | Refractive index (N) |
| --- | --- | --- | --- |
| Stop* | 1.70 | 0.62 | 1.53 |
| 2* | −35.00 | 0.100.120.19 |  |
| 3* | 28.85 | 0.33 | 1.64 |
| 4* | 2.53 | 0.32 |  |
| 5* | 3.64 | 0.35 | 1.53 |
| 6* | 5.95 | 0.36 |  |
| 7* | −5.90 | 0.64 | 1.53 |
| 8* | −1.37 | 0.33 |  |
| 9* | 10.23 | 0.58 | 1.53 |
| 10* | 1.22 | 0.72 |  |
| 11 | ∞ | 0.3 | 1.53 |
| 12 | ∞ | 0.180.190.20 |  |
| Image | ∞ | 0.010.01−0.01 |  |

The following Table 3 shows an aspheric coefficient in each of the surfaces.

TABLE 3

| Surface Number | K | A | B | C | D | E |
| --- | --- | --- | --- | --- | --- | --- |
| 1* | −0.5496 | 0.0205 | 0.0127 | −0.0088 | 0.0230 | −0.0044 |
| 2* | 0 | 0.0266 | 0.0073 | 0.0399 | −0.0659 | 0.0543 |
| 3* | 0 | −0.0380 | 0.0842 | −0.1002 | 0.0633 | −0.0154 |
| 4* | −18.2564 | 0.0537 | 0.0070 | −0.0068 | −0.0034 | 0.0077 |
| 5* | 0 | −0.1219 | 0.0202 | −0.0029 | 0.0322 | −0.0102 |

TABLE 3-continued

| Surface Number | K | A | B | C | D | E |
|---|---|---|---|---|---|---|
| 6* | 0 | −0.0524 | −0.0504 | 0.0242 | 0.0006 | 0.0071 |
| 7* | −50.0401 | 0.0339 | −0.0193 | −0.9173 | 0.0131 | −0.0022 |
| 8* | −0.7766 | 0.0897 | −0.0107 | 0.0036 | 0.0025 | −0.0010 |
| 9* | −2827.571 | −0.2146 | 0.1181 | −0.0460 | 0.0113 | −0.0011 |
| 10* | −7.7123 | −0.0897 | 0.0329 | −0.0089 | 0.0012 | −0.0001 |

In Table 3, the aspheric equation for the aspheric coefficients is as follows.

$$Z = \frac{CY^2}{1 + \sqrt{1 - (1+K)C^2Y^2}} + AY^4 + BY^6 + CY^{10} + EY^{12} + \ldots$$

Here, C denotes a curvature of the lens, Y denotes a distance in a direction perpendicular to the optical axis, k denotes a conic constant, and A, B, C, D and E denote aspheric constants.

Figure 2:
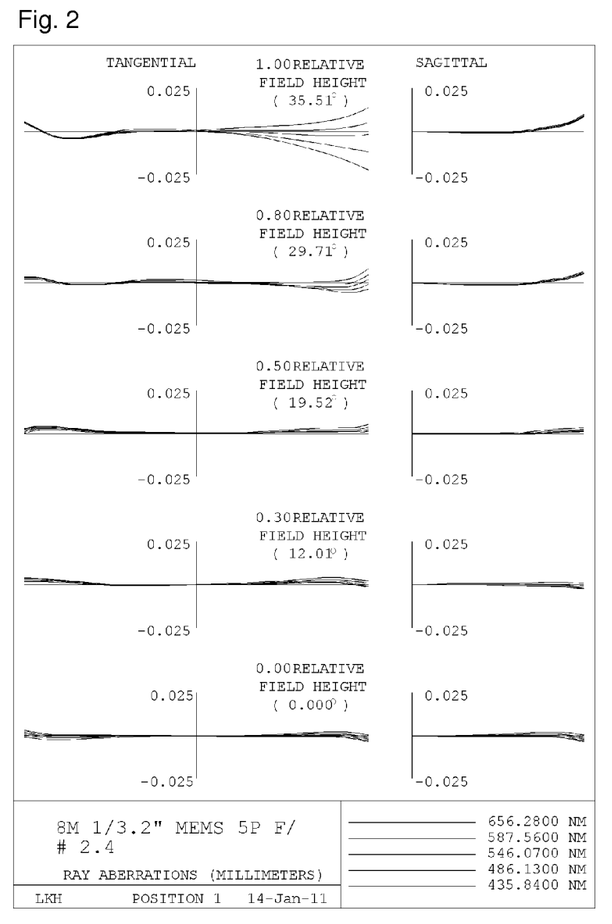
FIGS. 2 to 4 are graphs showing coma aberration characteristics according to embodiments of the present invention.
Figure 3:
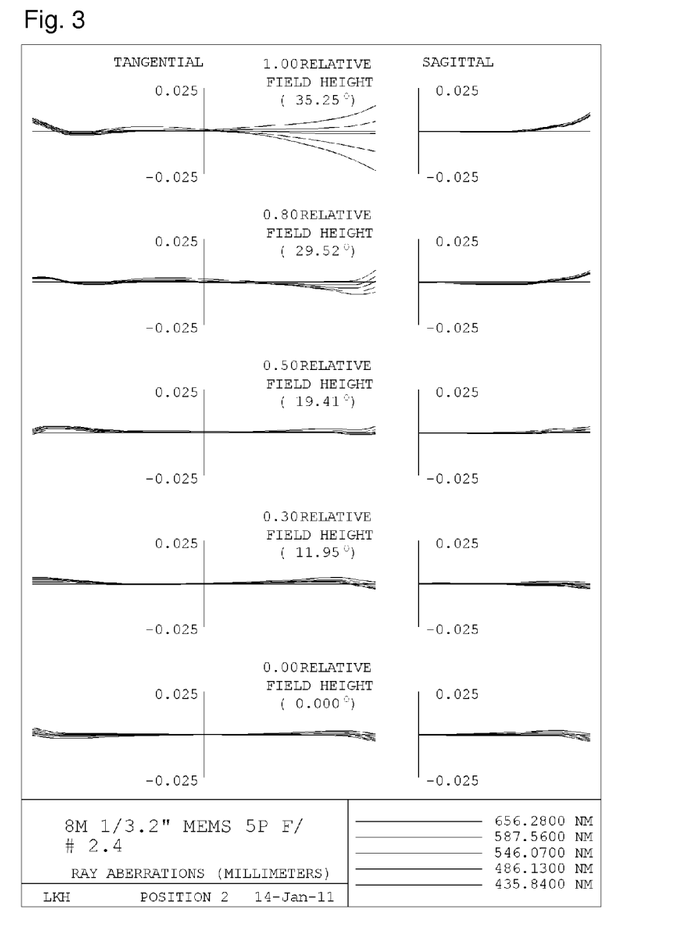
Figure 4:
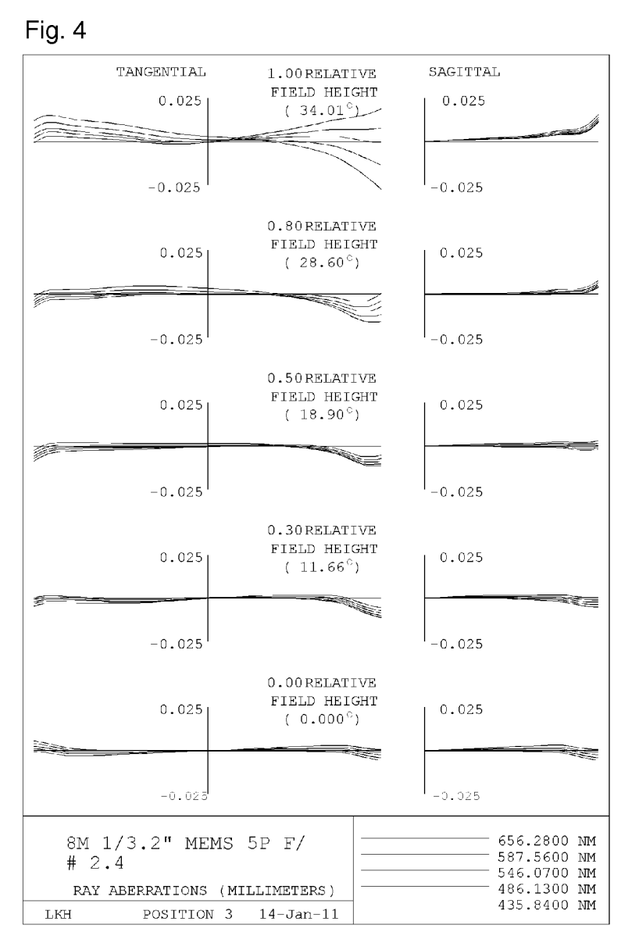

FIGS. 2 to 4 show the configuration of the lenses described with reference to FIG. 1 and coma aberration characteristics according to the embodiments mentioned in the tables. FIGS. 2 to 4 show coma aberrations in the first zoom position (tele position), the second zoom position (middle position) and the third zoom position (wide position), respectively.

Each of the graphs in FIGS. 2 to 4 shows tangential and sagittal aberration characteristics according to each wavelength, and it is identified that each line representing an experimental value approximates to the X-axis. It can be seen that the ray aberration correction function is excellent.

Figure 5:
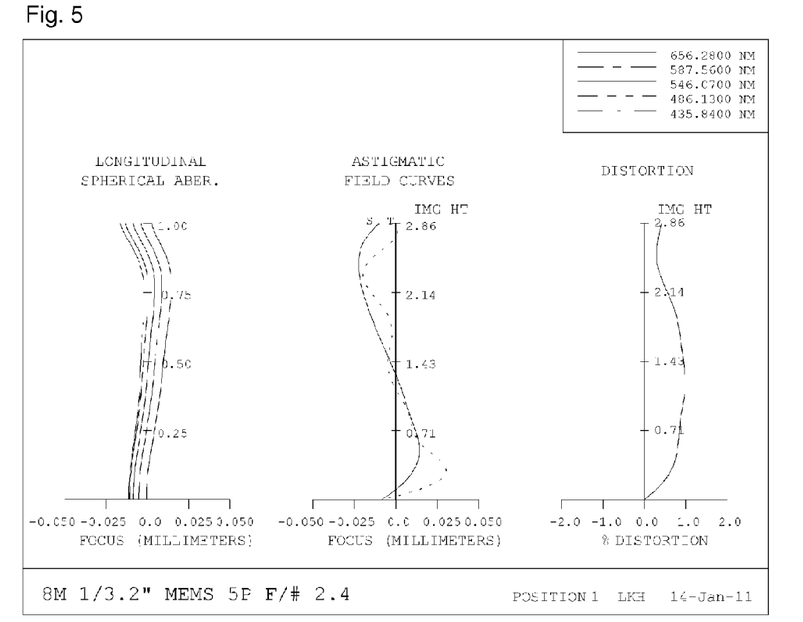
FIGS. 5 to 7 are graphs showing lens aberration characteristics according to embodiments of the present invention.
Figure 6:
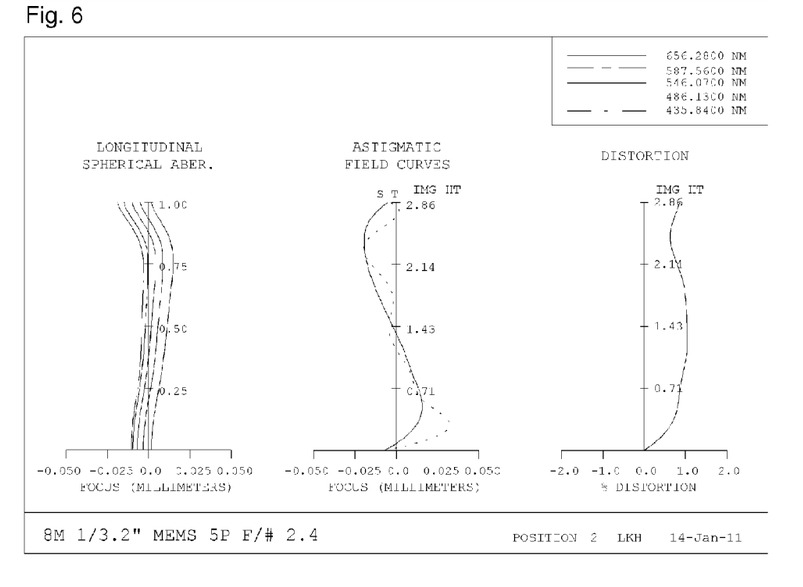
Figure 7:
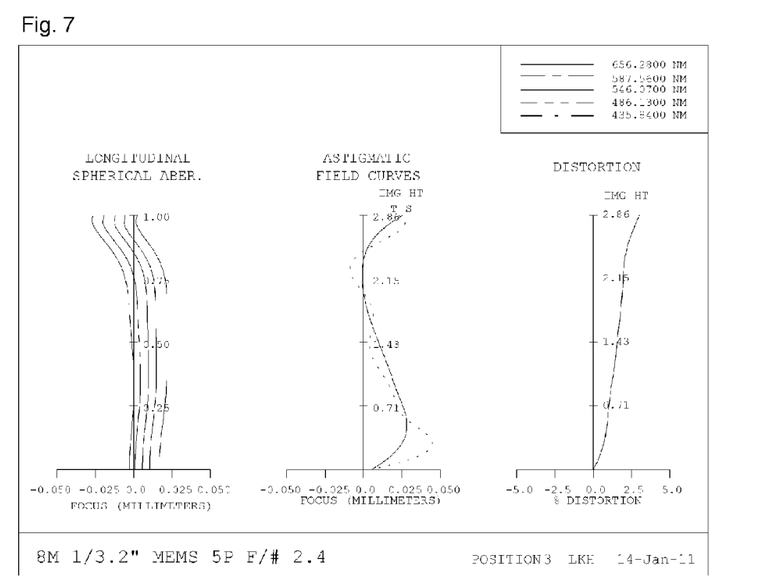

FIGS. 5 to 7 are graphs showing lens aberration characteristics according to embodiments of the present invention. FIGS. 5 to 7 show lens aberration characteristics in the first zoom position (tele position), the second zoom position (middle position) and the third zoom position (wide position), respectively.

In each of the graphs, the left graph is a graph obtained by measuring longitudinal spherical aberrations, the middle graph is a graph obtained by measuring astigmatic field curves, and the right graph is a graph obtained by measuring distortion aberrations.

In FIG. 5, the Y-axis indicates the size of an image, and the X-axis indicates a focal distance (mm) and a degree of distortion (%). In FIG. 5, it can be seen that the aberration correction function is excellent as curves approximate the Y-axis. In experimental values shown in FIG. 5, the longitudinal spherical aberration is positioned within a unit of 0.025, and the astigmatic field curves are positioned within the unit of 0.025, which shows a very excellent property.

While the distortion aberration is positioned within a unit of 1.0 in each of the tele position and the middle position, the distortion aberration is positioned within a unit of 3.5 in the wide position, which is relatively high. That is, a slight distortion generated in the wide position is a distortion value generated as a zoom lens is configured to have a microminiature size. The distortion can be processed using a separate distortion correcting means provided to an image signal processor (ISP), etc.

Figure 8:
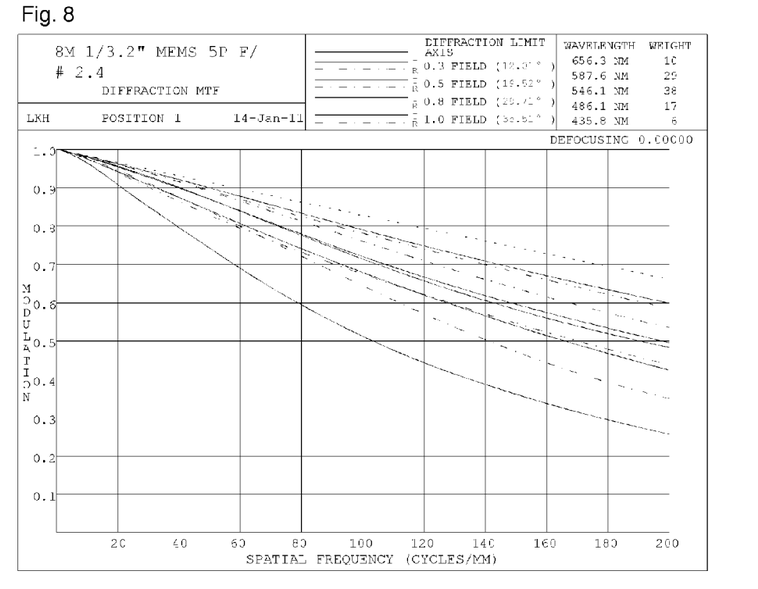
FIGS. 8 to 10 are graphs showing modulation transfer function (MTF) characteristics according to embodiments of the present invention.
Figure 9:
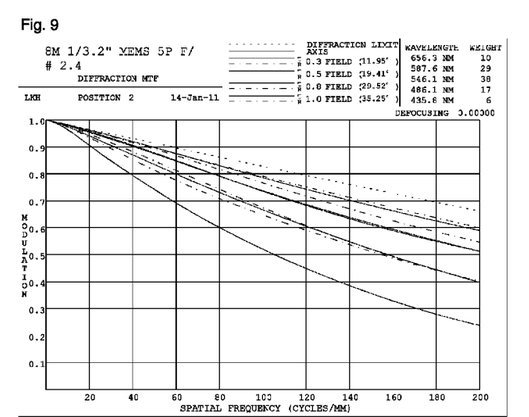
Figure 10:
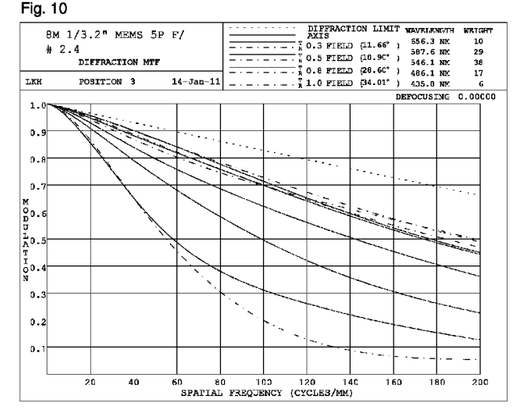

FIGS. 8 to 10 are graphs showing modulation transfer function (MTF) characteristics according to embodiments of the present invention. FIGS. 8 to 10 show MTF characteristics in the first zoom position (tele position), the second zoom position (middle position) and the third zoom position (wide position), respectively.

Here, MTF refers to a ratio value obtained by calculating a difference between the original image of a subject and the image formed by passing through a reflection or refraction surface. The MTF is a value related to resolution of the camera lens module.

In FIG. 8, the linear dotted and solid lines positioned at a top end indicate reference lines for the sagittal fields (X- and Y-axes) and a reference line for the tangential field (Z-axis). It can be seen that the curves (designated by dotted and solid lines) of each of the fields, positioned at a bottom end, have excellent resolution as they approach the reference lines.

Referring to experimental values of FIG. 8, it can be seen that the curves of each of the fields approach the reference lines in the tele position and the middle position, and the embodiments of the present invention have very high resolution. Since curves of most fields except some fields approach the reference lines at the top end, it can be seen that the embodiments of the present invention also have very high resolution.

Figure 11:
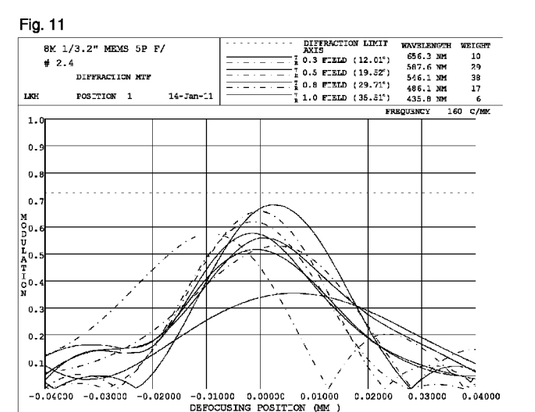
FIGS. 11 to 13 are graphs showing through-focus characteristics according to embodiments of the present invention.
Figure 12:
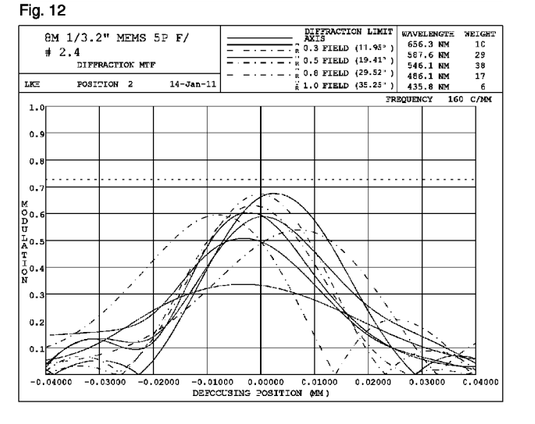
Figure 13:
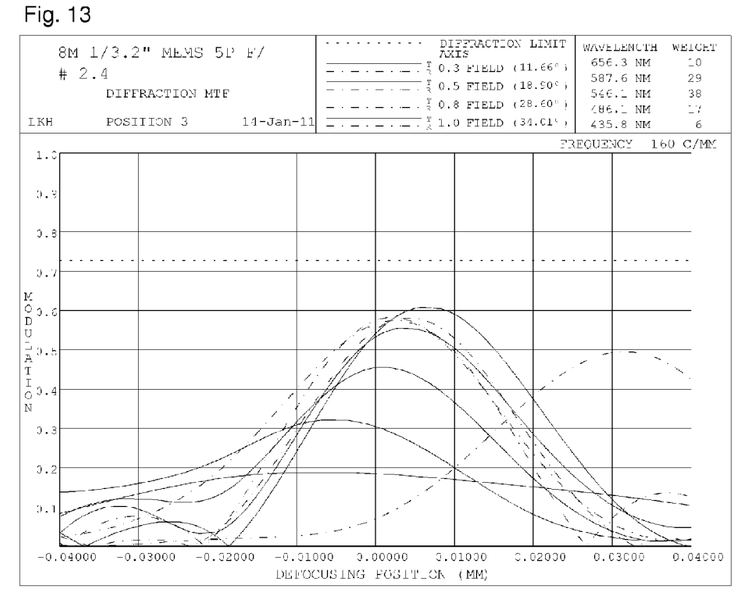

FIGS. 11 to 13 are graphs showing through-focus characteristics according to embodiments of the present invention. FIGS. 11 to 13 show through-focus characteristics in the first zoom position (tele position), the second zoom position (middle position) and the third zoom position (wide position), respectively.

FIGS. 11 to 13 show through-focus values that become references when assuming a parabolic solid line having maximum and minimum points has a resolution of 100 line pairs. It can be seen that the graph measured for each of the fields has an excellent through-focus value as it approaches the parabolic solid line Referring to FIGS. 11 to 13, it can be seen that the graph measured for each of the fields has a parabolic form and thus approaches a reference graph.

Although the present invention has been explained by the embodiments shown in the drawings described above, it should be understood to the ordinary skilled person in the art that the present invention is not limited to the embodiments but rather that various changes or modifications thereof are possible without departing from the spirit of the present invention. Accordingly, the scope of the present invention shall be determined only by the appended claims and their equivalents.

INDUSTRIAL APPLICABILITY

The present invention provides a camera lens module mounted in a camera module using an actuator, so that it is possible to implement high resolution and to allow a device to be slim in size, thereby performing a zooming operation at a high speed.

The invention claimed is:

1. A camera lens module wherein a first lens, a second lens, a third lens, a fourth lens, and a fifth lens are sequentially arranged from an object side to an image side,
   wherein the first lens is movable along an optical axis,
   wherein the second lens has a negative refractive power, and
   wherein the second lens has a meniscus shape with a convex surface on an object side thereof.

2. The camera lens module of claim 1, wherein a stop is positioned on an object side surface of the first lens.

3. The camera lens module of claim 1, wherein the first, second, third, fourth and fifth lenses are formed of a plastic material.

4. The camera lens module of claim 1, wherein the first lens has a positive refractive power.

5. The camera lens module of claim 1, wherein the fifth lens has a negative refractive power.

6. The camera lens module of claim 1, wherein at least one of the first, second, third, fourth and fifth lenses has at least one surface formed as an aspheric surface.

7. The camera lens module of claim 1, wherein each of the first, second, third, fourth and fifth lenses has at least one surface formed as an aspheric surface.

8. The camera lens module of claim 1, wherein each of the first, second, third, fourth and fifth lenses has both surfaces formed as aspheric surfaces.

9. The camera lens module of claim 1, wherein an image side surface of the third lens has an inflection point.

10. The camera lens module of claim 1, wherein an image side surface of the fourth lens has an inflection point.

11. The camera lens module of claim 1, wherein each of an object side surface and an image side surface of the fifth lens has one or more inflection points.

12. The camera lens module of claim 1, wherein an infrared filter is disposed between the fifth lens and an imaging surface.

13. The camera lens module of claim 1, wherein the focal distance of the first lens and the focal distance of a first zoom position in an optical system satisfy the following Conditional expression 1; (Conditional expression 1) $0.5 < f1/fz1 < 1.5$, wherein f1 denotes a focal distance of the first lens, and fz1 denotes a focal distance of the first zoom position in the optical system.

14. The camera lens module of claim 1, wherein the focal distance of the first lens and the focal distance of a second zoom position in the optical system satisfy the following Conditional expression 2; (Conditional expression 2) $0.5 < f1/fz2 < 1.5$, wherein f1 denotes a focal distance of the first lens, and fz2 denotes a focal distance of the second zoom position in the optical system.

15. The camera lens module of claim 1, wherein the focal distance of the first lens and the focal distance of a third zoom position in the optical system satisfy the following Conditional expression 3; (Conditional expression 3) $0.5 < f1/fz3 < 1.5$, wherein f1 denotes a focal distance of the first lens, and fz3 denotes a focal distance of the third zoom position in the optical system.

16. The camera lens module of claim 1, wherein the distance from an object side surface of the first lens to an imaging surface and the focal distance of the first zoom position in the optical system satisfy the following Conditional expression 6; (Conditional expression 6) $0.5 < \Sigma T/fz1 < 1.5$, wherein $\Sigma T$ denotes a distance from the object side surface of the first lens to the imaging surface, and fz1 denotes a focal distance of the first zoom position.

17. The camera lens module of claim 1, wherein the distance from an object side surface of the first lens to an imaging surface and the focal distance of the second zoom position in the optical system satisfy the following Conditional expression 7; (Conditional expression 7) $0.5 < \Sigma T/fz2 < 1.5$, wherein $\Sigma T$ denotes a distance from the object side surface of the first lens to the imaging surface, and fz2 denotes a focal distance of the second zoom position.

18. The camera lens module of claim 1, wherein the distance from an object side surface of the first lens to an imaging surface and the focal distance of the third zoom position in the optical system satisfy the following Conditional expression 8; (Conditional expression 8) $0.5 < \Sigma T/fz3 < 1.5$, wherein $\Sigma T$ denotes a distance from the object side surface of the first lens to the imaging surface, and fz3 denotes a focal distance of the third zoom position.

19. The camera lens module of claim 1, wherein the refractive index of the first lens satisfies the following Conditional expression 9; (Conditional expression 9) $1.5 < N1 < 1.6$, wherein N1 denotes a refractive index of the first lens.

20. The camera lens module of claim 1, wherein the refractive index of the second lens satisfies the following Conditional expression 10; (Conditional expression 10) $1.6 < N < 1.7$, wherein N2 denotes a refractive index of the second lens.

21. The camera lens module of claim 1, wherein the refractive index of the third lens satisfies the following Conditional expression 11; (Conditional expression 11) $1.5 < N3 < 1.6$, wherein N3 denotes a refractive index of the third lens.

22. The camera lens module of claim 1, wherein the refractive index of the fourth lens satisfies the following Conditional expression 12; (Conditional expression 12) $1.5 < N4 < 1.6$, wherein N4 denotes a refractive index of the fourth lens.

23. The camera lens module of claim 1, wherein the refractive index of the fifth lens satisfies the following Conditional expression 13; (Conditional expression 13) $1.5 < N5 < 1.6$, wherein N5 denotes a refractive index of the fifth lens.

24. The camera lens module of claim 1, wherein the Abbe number of the first lens satisfies the following Conditional expression 14; (Conditional expression 14) $50 < V1 < 60$, wherein V1 denotes an Abbe number of the first lens.

25. The camera lens module of claim 1, wherein the Abbe the Abbe number of the second lens satisfies the following Conditional expression 15; (Conditional expression 15) $20 < V2 < 30$, wherein V2 denotes an Abbe number of the second lens.

26. The camera lens module of claim 1, wherein the Abbe number of the third lens satisfies the following Conditional expression 16; (Conditional expression 16) $50 < V3 < 60$, wherein V3 denotes an Abbe number of the third lens.

27. The camera lens module of claim 1, wherein the Abbe number of the fourth lens satisfies the following Conditional expression 17; (Conditional expression 17) $50 < V4 < 60$, wherein V4 denotes an Abbe number of the fourth lens.

28. The camera lens module of claim 1, wherein the Abbe number of the fifth lens satisfies the following Conditional expression 18; (Conditional expression 18) $50 < V5 < 60$, wherein V5 denotes an Abbe number of the fifth lens.

29. The camera lens module of claim 1, wherein the distance from an object side surface of the first lens to an imaging surface satisfies the following Conditional expression 19; (Conditional expression 19) $4.7 < \Sigma T < 5.9$, wherein $\Sigma T$ denotes a distance from the object side surface of the first lens to the imaging surface.

30. The camera lens module of claim 1, wherein the F-number of the camera lens module satisfies the following Conditional expression 20; (Conditional expression 20) $2.0 < F\text{-number} < 3.0$.

31. The camera lens module of claim 1, wherein the third lens has a positive refractive power.

32. The camera lens module of claim 31, wherein the third lens has a meniscus shape with a convex surface on an object side thereof.

33. The camera lens module of claim 1, wherein the fourth lens has a positive refractive power.

34. The camera lens module of claim 33, wherein the fourth lens has a meniscus shape with a convex surface on an object side thereof.

35. The camera lens module of claim 1, wherein the air interval between centers of the first and second lenses in the first zoom position satisfies the following Conditional expression 4; (Conditional expression 4) $0.1 < d1 < 0.4$, wherein d1 denotes an air interval between the centers of the first and second lenses in the first zoom position.

36. The camera lens module of claim 35, wherein the photographing range of the first zoom position is infinite.

37. The camera lens module of claim 1, wherein the air interval between the centers of the first and second lenses in the third zoom position satisfies the following Conditional expression 5; (Conditional expression 5) $0.15<d3<0.51$, wherein d3 denotes an air interval between the centers of the first and second lenses in the third zoom position.

38. The camera lens module of claim 37, wherein the photographing range of the third zoom position is 10 cm.

* * * * *